June 11, 1963  S. P. SCHAFTENER ETAL  3,093,150
CAR TOP TENT
Filed Sept. 16, 1960  3 Sheets-Sheet 1
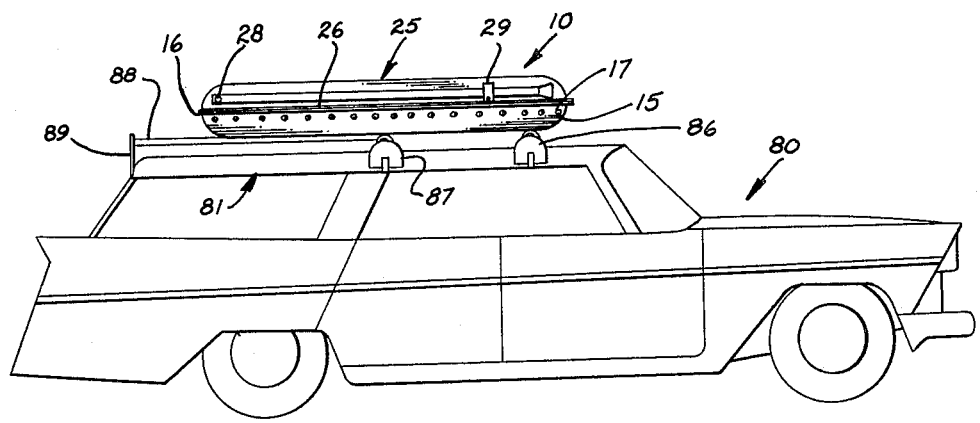
FIG. 1
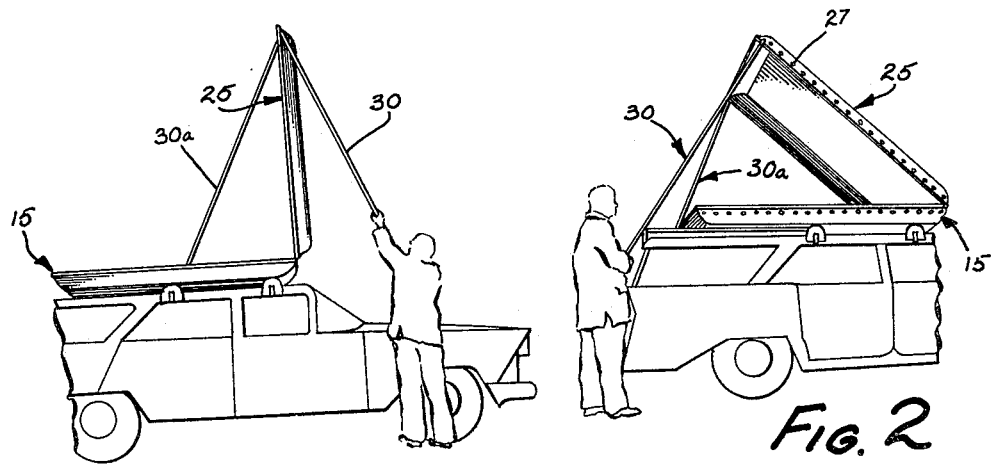
FIG. 3
FIG. 2
INVENTORS
STUART P. SCHAFTENER
LLOYD W. ANDERSON
BY *Price and Heneveld*
ATTORNEYS

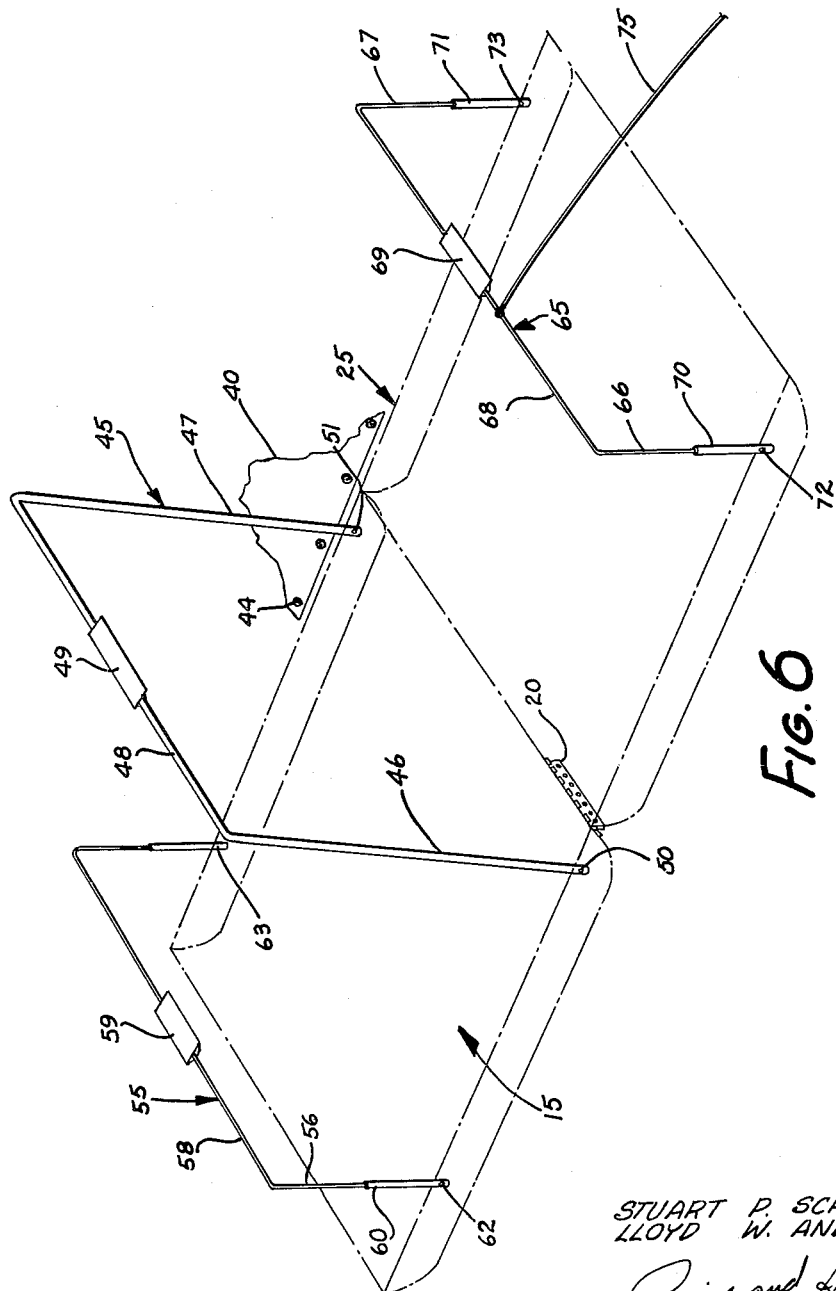

United States Patent Office 3,093,150
Patented June 11, 1963

3,093,150
CAR TOP TENT
Stuart P. Schaftener, 661 Hazelbank Drive, and Lloyd W. Anderson, 9 W. 35th St., both of Holland, Mich.
Filed Sept. 16, 1960, Ser. No. 56,396
5 Claims. (Cl. 135—1)

This invention relates to a car top tent, and more particularly to a car top tent which can be collapsed and stored in a trunk supported by a car top carrier and readily erected to a set up position.

Although car top tents are presently available, as a whole they are not too successful. One reason for this is that the present car top tent structures are rather complicated in design. This increases the cost of manufacture and the resultant price to the consumer providing an article which is not competitive. Another disadvantage of the present types of car top tents is that they are difficult to erect or set up.

The present invention overcomes many of the above problems by providing a car top tent which has a minimum number of component parts. These parts are interrelated in a manner such that the erection and collapsing of the tent is a simple matter.

It is therefore an object of this invention to provide a car top tent which can be collapsed and stored in a clam shell-like trunk which is secured to a car top carrier and the trunk opened to form the floor of the tent which is erected thereupon.

Yet another object of this invention is to provide support means which are utilized to open and close the trunk and thereafter provide support for a portion of the trunk.

Still another object of this invention is to provide a car top tent having means secured to the superstructure thereof which provides for erection of the tent by an individual standing on the ground.

Another object of this invention is to provide a car top tent which has a minimum number of component parts and is therefore economical to manufacture.

Yet another object of this invention is to provide a car top tent which is of a rigid and tight construction to withstand the weight of individuals, the weather elements, and bugs and insects.

These and other objects and advantages of this invention will become more apparent upon reading the following specification in conjunction with the drawings.

In the drawings:

FIG. 1 is a side elevational view of the car top tent showing it mounted upon a vehicle and in the collapsed position;

FIG. 2 is a perspective view of the car top tent showing the first step in the tent erection;

FIG. 3 is a side elevational view of the car top tent showing the second step in the tent erection;

FIG. 6 is a perspective view showing the superstructure of the tent;

Figure 5:
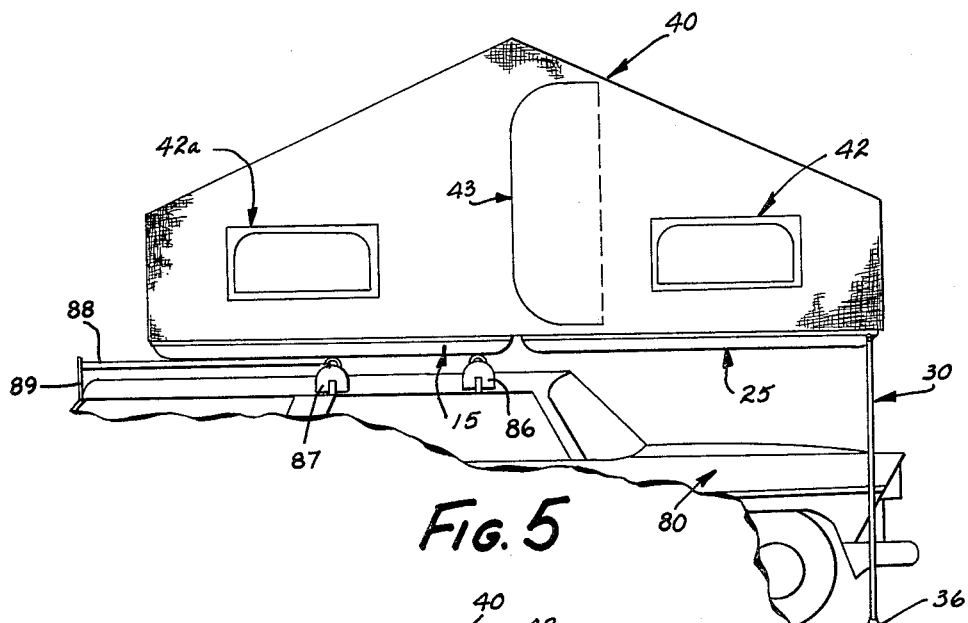
FIG. 5 is a side elevational view showing the tent fully erected.

Basically, this invention is concerned with a car top tent which can be collapsed into a container or trunk supported by a car top carrier, the trunk opening to form the floor of the tent which is secured thereto and erected thereupon. The trunk is a two-piece unit having a base which is secured to the car top carrier and a cover which is hingedly secured to one end of the base. The cover may be pivoted to an open position wherein the base and cover lie in an adjacent end to end relationship, together forming the floor of the tent. Support means in the form of posts are pivotally secured to opposite sides of the one end of the cover, and operate as handles which are utilized in opening the cover. They thereafter act as supports for positioning and maintaining the cover on a level with the base. Tent stays are pivotally attached to the floor and to tent material such as canvas. A rope is secured to one tent stay and is utilized to pull the tent stays and tent material into the erected position. Detachable fastening elements are secured to the bottom of the tent, and engage fastening members formed on the base and cover to secure the tent material to the floor. The end stays are extendible to provide a means of tensioning the tent material.

The car top tent assembly is designated generally as 10. The assembly 10 includes the trunk base 15, the hinges 20 which connect the trunk cover 25 to the base 15, the support posts 30 and 30a, the tent top structure 40, and the assembly rope 75. The car top tent assembly is secured to a car top carrier designated generally as 85 which is in turn secured to the top 81 of a car 80.

Referring now specifically to the details of the invention, the trunk base 15 is a generally rectangular, shallow, dish-shaped member. It has a lip or flange 16 (FIG. 1) which is formed about the upper edge thereof and projects outwardly therefrom. The base 15 may be constructed from a composition material such as fiberglass, or from some other well-known material which may be easily molded to the proper form. The base 15 is provided with a series of male portions of snap fasteners positioned at equally spaced intervals about the three sides of the periphery thereof other than the hinged side. The snap fastener portions are positioned adjacent the flange 16 formed on the base.

As best shown in FIG. 1, the base portion 15 is secured to the car top carrier 85 by appropriate fastening means (not shown). The car top carrier 85 consists of a front carriage bar 86, rear carriage bar 87, and rear suspension bars 88 which are supported by the rear carriage bar 87 at one end and support brackets 89 at the back of the vehicle. The front carriage 86, rear carriage 87, and brackets 89 are secured to the auto top 81 by appropriate fastening means. The base 15 is thus supported by the front carriage bar 86, the rear carriage bar 87 and the suspension bars 88.

Hingedly secured to the one end of the base 15 by hinges 20 (FIG. 6) is the trunk cover which is designated generally as 25. The cover 25 is substantially similar in configuration to that of the base 15. However, it is pivotally attached to the base 15 in a reverse manner such that the flange 26 thereof abuts the flange 16 of base 15. The base 15 and cover 25 are hinged together at the ends thereof which are adjacent the windshield of the car. The purpose for this is to allow the cover to be positioned over the front or rear of the car when it is in the open position thus locating both the base and cover over car area.

The cover 25 is provided with a series of equally spaced male snap fastener portions 27 about three sides of the periphery. These snap fastener portions are positioned adjacent the flange 26.

Pivot pins 28 are positioned on opposite sides of the cover 25 adjacent the end thereof which is opposite the hinged end. The pivot pins 28 are utilized to attach support posts 30 and 30a, to be explained more fully hereinafter, to the cover 25.

On either side of the cover 25 adjacent the hinge end thereof are clasps 29 which are utilized to maintain the support posts in position adjacent the cover 25 when the car top tent is in the collapsed and stored position. The clasps 29 are constructed from resilient material and are of a design such that the support members may be snapped into and out of engagement therewith.

The support member or posts 30 and 30a are substantially identical; therefore, only one of these members will be explained in detail. The support member 30 has a hollow casing 31 and an extension rod 32 which is telescoped therein. The extension rod 32 has a buckle 33 fixedly secured to the end thereof which is opposite the end telescoped in casing 31. A clamp 34 is secured to the casing 31, and has a thumbscrew 35 which passes through an aperture formed in the casing and engages the extension rod 32. The extension rod 32 may be extended or retracted with respect to the casing 31 and maintained in a given position with respect thereto by tightening the thumbscrew 35 of clamp 34. The end of the casing 31 opposite the end thereof which receives extension rod 32 is provided with a resilient rest 36.

Figure 4:
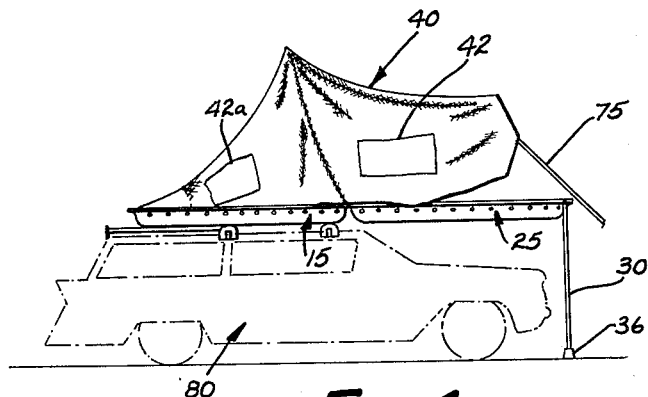
FIG. 4 is a side elevational view of the car top tent showing the fourth and fifth steps in the tent erection.
Figure 7:
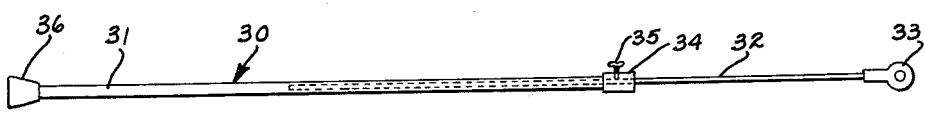
FIG. 7 is a side elevational view of one of the support posts.

The buckle 33 is provided with an aperture which allows passage of the pivot pin 28 to pivotally secure support post 28 to the cover 25. The support member or post 30a is pivotally secured to the other side of the cover 25 in a similar manner. When the car top tent is in the stored position, the posts 30 and 30a are clamped to the cover 25 by the resilient clasps 29. The posts 30 and 30a are utilized as handles when it is desired to open the cover 25 and position it in end to end relationship with the base 15. FIGS. 2, 3 and 4 illustrate how the posts 30 and 30a are utilized in this manner. When the cover 15 is fully open, the posts 30 and 30a are utilized to support the one end of the cover 25 as best shown in FIG. 5.

FIG. 6 best illustrates the superstructure of the tent which supports the tent material. This structure includes the end stays 55 and 65 and the main stay 45 now to be described.

The main stay 45 is a generally U-shaped member having legs 46 and 47 which are connected at one of their respective ends by cross bar 48. The other ends of the legs 46 and 47 are connected to the base 15 by pivotal attachment means 50 and 51 respectively. The pivotal attachment points 50 and 51 are spaced inwardly a small distance from the hinged end of the base 15 to prevent interference of the main stay with the opening and closing of the cover 25. The legs 46 and 47 of the main stay 48 are of a length so that the main stay 48 may pivot in a counterclockwise direction as viewed in FIG. 6, and lie flat within the confines of the base 15 when the tent is in the collapsed position.

The cross bar 48 has secured thereto a canvas clasp 49 which is in turn attached to the tent top 40. Thus, when the main stay 48 is moved, the tent material is moved therewith since the material clasp 49 is secured to the tent material. Although only one clasp is shown, it is to be understood that within the broad aspects of the invention more may be used if so desired.

An end stay 55 is attached to the base 15 adjacent the end opposite the main stay connection. It is also a generally U-shaped member having legs 56 and 57 connected together at one of their ends by cross bar 58. Leg guides 60 and 61 are pivotally attached to the base 15 by pivotal connections 62 and 63 respectively. The guide legs 60 and 61 are positioned diametrically opposite each other on the sides of the base 15. They are spaced inwardly, toward the main stay 48, from the opposite end of the base 15. The legs 56 and 57 of the end stay 55 are telescopically received in the leg guides 60 and 61. The end stay 55 is thus extendible due to the telescoping feature between the legs and leg guides. Clamping means (not shown) may be positioned on the leg guides 60 and 61 and utilized to secure the end stay 55 in various positions of extensions. A material clasp 59 is secured to the crossbar 55 and tent material 40.

Another end stay 65 is secured to the cover 25. The end stay 65 is substantially similar in configuration to that of the end stay 55. It has legs 66 and 67 which are connected together at one of their ends by crossbar 68. Guide legs 70 and 71 are pivotally attached to the cover 25 by pivotal attachments 72 and 73 respectively. The legs 66 and 67 are telescoped within the guide legs 70 and 71. The guide legs 70 and 71 may be provided with clamps (not shown) for fixing the end stay 65 in a given position of extension. A material clasp 69 is secured to the crossbar 68, and is in turn secured to the tent top 40 by appropriate fastening means.

The end stays 55 and 65 are of a height such that when in the collapsed position they fit within the confines respectively of the base 15 and cover 25. The end stays 55 and 65 provide support for the ends of the tent and the main stay 48 provides support for the middle of the tent.

An assembly rope 75 is tied to the end stay 65 at approximately the center of crossbar 68. The assembly rope 75 is utilized to erect the tent in a manner to be explained more fully in the operation and assembly of the car top tent now to be described.

The tent top 40 is of the conventional cottage tent design and is made from canvas or other tent material. It has windows 42 and 42a and a door 43 in the side viewed in FIG. 5. Windows (not shown) are placed in the sides of the tent. Male snap fastener portions 44 (FIG. 6) are secured to the bottom edge of the tent top 40 and are spaced at the same interval about the periphery thereof as the spacing of the female snap fastener portions 17.

Operation and Assembly

In explaining the operation and assembly of the car top tent structure, initially it will be assumed that the car top tent is in the collapsed and stored position as shown in FIG. 1. In this position, the cover 25 is positioned directly over the base 15 and the flanges 26 and 16 of the respective members are in abutting engagement forming a closed trunk or container with the tent top structure stored therein. Some type of lock structure (not shown) may be placed at the ends of the base and cover opposite their hinged connection to lock the members together. Assuming such a lock is present, the first step is to unlock the trunk so that the cover 25 is free to move with respect to the base 15.

Thereafter, the posts or support members 30 and 30a are loosened from their respective clasps 29. As shown in FIG. 1, the posts are rotated in a counterclockwise manner about the pivot pin 28 until they assume a downwardly directed position.

The cover 25 must be rotated through an angle of approximately 180 degrees to position it in the open position. Thus, the pivot pins 28 to which the posts 30 and 30a are secured reach a point which is of substantial height above the ground. Since the posts 30 and 30a are used as handles to rotate the cover to the open position, it is usually necessary to loosen the clamps on the posts 30 and 30a and lengthen them sufficiently so that they can be continuously grasped by the individuals rotating the cover 25. This is particularly true if the individuals setting up the car top tent are of short stature. The posts 30 and 30a are then extended to the degree necessary to allow the individuals to continuously grip the posts throughout the rotation of the cover 25.

As best shown in FIG. 2, one individual grasps the post 30 at one side of the car and another person grasps the post 30a at the other side of the car. When lifting pressure is exerted on the posts 30 and 30a, the cover 25 will move in a clockwise direction as shown in FIG. 2. The individuals walk toward the hinged end of the trunk as they exert pressure on the posts 30 and 30a causing continued rotation of the cover. When the cover 25 has been moved to a position of slightly less than 90 degrees, the one individual stops walking and supports the cover in this position as best shown in FIG. 3. The other individual relinquishes lifting pressure; however, continues to walk and pivots the post 30a to a position in front of the cover. The cover 25 is then moved slightly over the 90 degree position, and the individual holding the post 30a supports the cover 25 until the individual working with the post 30a walks forward to an opposite position. The cover 25 is then gradually lowered until it assumes an end to end position with respect to the base 15.

Thereafter, the posts 30 and 30a are positioned such that the rests 36 thereof engage the ground thus supporting the end of the cover 25. This is best shown in FIGS. 4 and 5. The posts 30 and 30a usually require adjusting so that the cover 25 will be supported at the same level as the base 15. The base 15 and cover 25 in this position form the floor of the tent.

The tent top is now assembled. The legs 66 and 67 are inserted in the leg guides 70 and 71 respectively. The assembly rope 75 is then grasped and the collapsed tent structure pulled toward the end of the floor structure. The end stay 55, the main stay 48, and the end stay 68 will all pivot in a clockwise manner. Since the tent material 41 is secured to the stays by the canvas holes 49, 59 and 69, the tent will move into the erected position as tension is applied to the assembly rope 75. This phase of the tent setup is best shown in FIG. 4. Since the main stay 48 is offset from the center of the floor, which is the point of hinge connection between the base and cover, it will move over-center upon the erection of the tent and will maintain it in the erected position.

The end stays 55 and 65 may now be extended to tension the tent material 41 on the tent superstructure. The tent is then fully erected and ready for use.

The tent is collapsed or disassembled in the reverse manner. The end stay 55 must be retracted before the tent is collapsed so that it will fit in the confines of the base 15. The end stay 65 is removed from the leg guides 70 and 71 when the tent is collapsed.

From the above disclosure it can be seen that the car top tent disclosed herein is extremely simple to assemble and disassemble. The tent is made of a minimum number of components and is therefore economical to manufacture. The car top tent is of rugged construction and can withstand the weight of several people. The tent is particularly designed to protect against weather elements and is tightly fitted to the floor of the tent to prevent entry of insects, bugs and other foreign matter. The tent is designed so that it may be erected from a standing position on the ground.

While a preferred embodiment of this invention has been described, it will be understood that modifications and improvements may be made thereto. Such of these modifications and improvements as incorporate the principles of this invention are to be considered as included in the hereinafter appended claims unless these claims by their language expressly state otherwise.

We claim:
1. A car top tent comprising: a trunk having a base adapted to be secured to a car top carrier, a single trunk cover coextensive with said base and hingedly secured to said base along one of its sides; a pair of posts pivotally secured to said cover opposite said hingedly connected side, said posts being of sufficient length for the average height person to reach when the cover is in a vertical pivotal position, one of said posts being pivotal in one direction to a position where its lower end is on one side of the vertical pivotal position of said cover and the other of said posts being pivotal in a direction where its lower end is on the other side of the vertical pivotal position of said cover whereby the weight of said cover can be transferred from one post to the other in pivoting the cover to and past the vertical position and whereby said posts can be operated as actuating means to lift and steady said cover upon opening thereof; said cover when open lying in the same plane as said base and together with said base forming the floor of a tent, collapsible tent top means stored within said trunk and secured thereto, and means for setting up said tent top means to form a car top tent structure.

2. The car top tent of claim 1 in which the posts are extendible and retractable whereby when extended they serve as actuating means to open the cover and when retracted they serve as support means for supporting said cover when open.

3. The car top tent of claim 1 in which the collapsible tent top means includes a main stay and end stays pivotally secured to said floor, tent material secured to said stays, and means secured to one of said end stays for moving said stay and erecting said tent top structure.

4. A car top tent as in claim 3 wherein said end stays are extendible to tension said tent material.

5. A car top tent as in claim 3 wherein said means for setting up said tent top means includes a rope secured to said one end stay and being of sufficient length to provide access from the ground for applying force to said end stay for erection of said tent by an individual standing on the ground.

References Cited in the file of this patent
UNITED STATES PATENTS

| | | |
|---|---|---|
| 1,424,222 | Tuttle | Aug. 1, 1922 |
| 2,459,026 | Hardy | Jan. 11, 1949 |
| 2,643,395 | Stassinos | June 30, 1953 |
| 2,857,924 | Gibbons et al. | Oct. 28, 1958 |
| 2,917,059 | Emanuelson | Dec. 15, 1959 |
| 2,942,609 | Ferguson | June 28, 1960 |